May 16, 1933.  H. A. KUHN  1,909,284
FENDER TOOL
Filed July 15, 1932  2 Sheets-Sheet 1
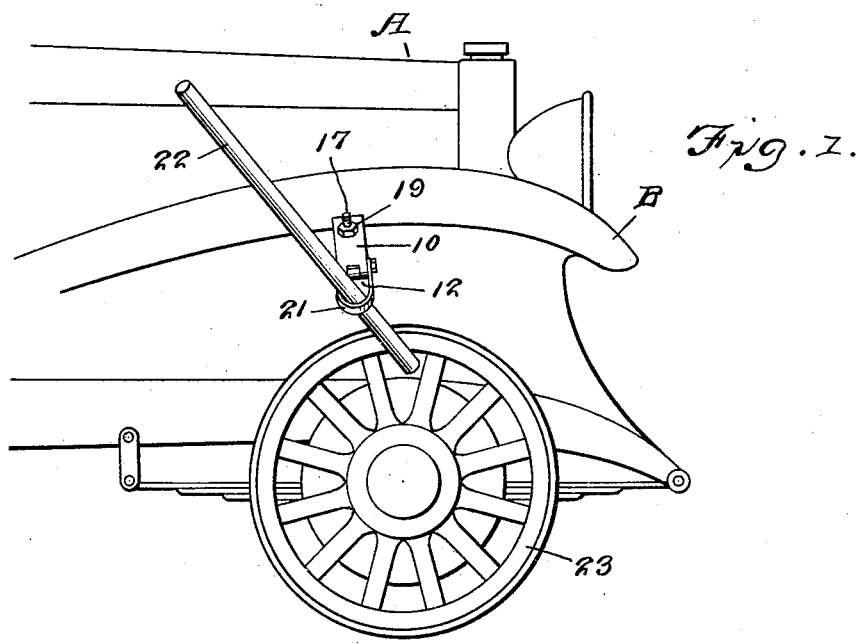
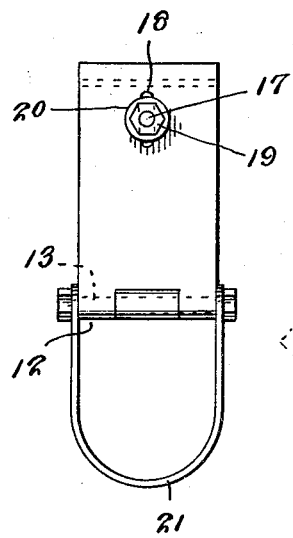
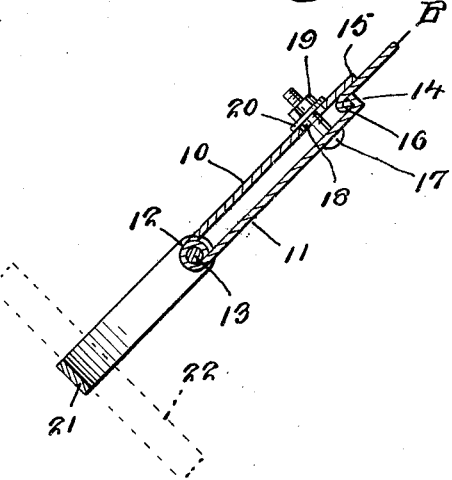
Henry A. Kuhn
INVENTOR
BY Victor J. Evans & Co.
ATTORNEY

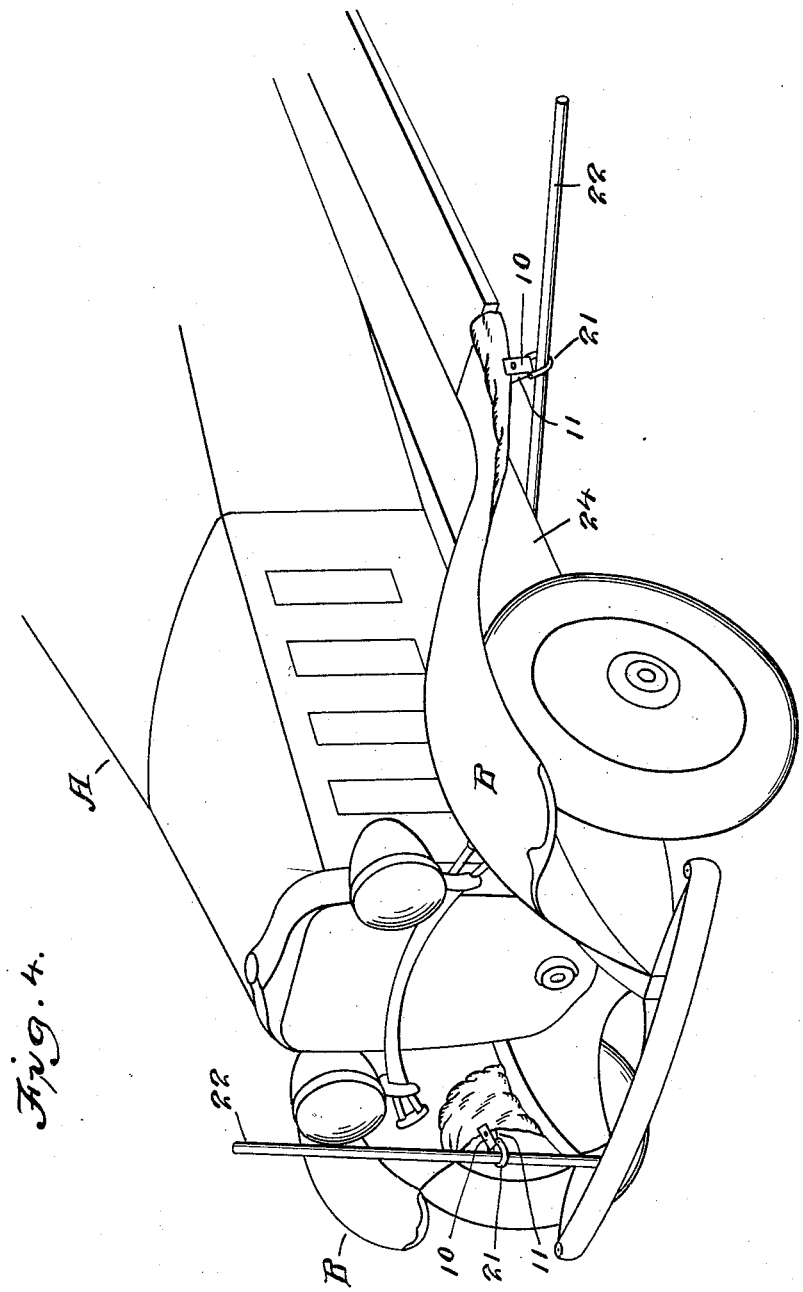

Patented May 16, 1933

1,909,284

UNITED STATES PATENT OFFICE

HENRY A. KUHN, OF ZANESVILLE, OHIO

FENDER TOOL

Application filed July 15, 1932. Serial No. 622,724.

The invention relates to a fender tool and more especially to tools for removing irregularities, dents or the like from fenders of automobiles or for straightening such fenders.

The primary object of the invention is the provision of a tool of this character, wherein a damaged fender upon an automobile can be readily and easily straightened, the tool being of a kind as to permit the application thereof at varying localities or throughout the extent of the fender so that the latter can be acted upon for the straightening thereof when it becomes bent, dented or otherwise damaged, the tool being readily operable by hand.

Another object of the invention is the provision of a tool of this character, wherein the jaw member of the tool can be readily engaged with the bead of an automobile fender at the point where the latter is damaged so that by hand manipulation of the tool such fender can be straightened with dispatch, the tool being of novel construction and is readily portable so as to permit the placing thereof at varying localities with relation to the fender to be operated upon.

A further object of the invention is the provision of a tool of this character which is extremely simple in construction, thoroughly reliable and efficient in its operation, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a fragmentary side elevation of an automobile showing the fender tool constructed in accordance with the invention and illustrative of one application to the automobile fender.

Figure 2 is a plan view of the jaw member of the tool.

Figure 3 is a longitudinal sectional view thereof.

Figure 4 is a fragmentary perspective view of an automobile showing two applications of the fender tool to the fenders of said automobile.

Similar reference characters indicate corresponding parts throughout the several views in the drawings.

Referring to the drawings in detail, A designates generally a portion of an automobile and B one of its fenders to be operated upon by the fender tool hereinafter fully described and constituting the present invention.

The fender tool comprises a jaw member which includes the plate-like jaws 10 and 11 respectively, these being formed with pintle sleeves 12 cut and arranged for interfitting relation to accommodate a pivot bolt 13 so that the jaws 10 and 11 will be swingingly connected together. The jaw 11 at its free end is formed with a lip 14 disposed inwardly at right angles to said jaw, while the jaw 10 has its free end 15 disposed in overlapping relation to the lip 14 so that the lip may be hooked with the bead 16 of the fender B and the jaw 10 at its free end will overlap said bead 16 with the lip 14 in hooked relation to the latter and thus the jaw member firmly engaged with the fender B for the straightening thereof when damaged by becoming crushed or distorted, dented or otherwise disfigured.

Engaged in the jaw member 11 is a bolt 17, the same being passed through an elongated slot 18 in the jaw 10 and this bolt carries a nut 19 playing against a washer 20 upon said bolt and overlying the slot 18, the bolt and nut being adapted to secure the jaws 10 and 11 in clamping relation to the bead 16 of the fender B as is clearly illustrated in Figure 3 of the drawings.

The pivot member has loosely engaged therewith a substantially U-shaped bail or loop 21 while adapted to be passed through the said bail or loop 21 is a bar 22, the latter being freely slidable in the bail or loop 21 and the said bar at one end is adapted to contact with a part of the automobile, as for example, the wheel 23 as shown in Figure 1 of the drawings or the chassis 24 as shown in Figure 4 of said drawings so that pressure by hand may be applied to the other end of the bar 22 when the jaw member is engaged with the fender B for the straightening thereof. As has been stated, the leverage of the bar 22, when engaged in the bail or loop 21, may be changed or altered by shifting said bar 22 in the bail or loop. This bar 22 can be disposed at different angles to engage with the automobile when inserted in the bail or loop 21 and the jaw member engaged with the fender B of said automobile whereby the bar 22 may be operated for the manipulation of the tool in the straightening of the fender.

What is claimed is:

1. A tool of the character described comprising swingingly connected jaws, a lip on one jaw and overlapped by the other jaw, means for bringing the jaws in clamping relation to each other, a bail swingingly connected with the jaws, and a bar loosely insertable in the bail.

2. A tool of the character described comprising swingingly connected jaws, a lip on one jaw and overlapped by the other jaw, means for bringing the jaws in clamping relation to each other, a bail swingingly connected with the jaws, a bar loosely insertable in the bail, and a pivot swingingly connecting the jaws and the bail together.

In testimony whereof I affix my signature.

HENRY A. KUHN.